United States Patent
Backfolk et al.

(10) Patent No.: US 12,371,582 B2
(45) Date of Patent: Jul. 29, 2025

(54) PROCESS FOR PRODUCTION OF FILM OR COATING COMPRISING CELLULOSIC NANOMATERIAL

(71) Applicant: Stora Enso OYJ, Helsinki (FI)

(72) Inventors: Kaj Backfolk, Villmanstrand (FI); Isto Heiskanen, Imatra (FI); Jukka Kankkunen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 1050 days.

(21) Appl. No.: 17/294,794

(22) PCT Filed: Nov. 27, 2019

(86) PCT No.: PCT/IB2019/060208
§ 371 (c)(1),
(2) Date: May 18, 2021

(87) PCT Pub. No.: WO2020/110013
PCT Pub. Date: Jun. 4, 2020

(65) Prior Publication Data
US 2021/0403734 A1   Dec. 30, 2021

(30) Foreign Application Priority Data
Nov. 28, 2018   (SE) .................................. 1851474-5

(51) Int. Cl.
*C09D 11/14* (2006.01)
*C08J 5/18* (2006.01)
*C08L 1/02* (2006.01)

(52) U.S. Cl.
CPC .............. *C09D 11/14* (2013.01); *C08J 5/18* (2013.01); *C08L 1/02* (2013.01); *C08J 2301/02* (2013.01); *C08L 2203/16* (2013.01)

(58) Field of Classification Search
CPC ........ C09D 11/14; C09D 7/65; C09D 101/02; C09D 5/00; C08J 5/18; C08J 2301/02; C08L 1/02; C08L 2203/16; C08L 2201/14; Y02E 60/10; D21H 11/18; D21H 19/34; D21H 19/52; B29D 7/01; B32B 27/10; B32B 2307/7244
USPC .................................................. 106/163.01
See application file for complete search history.

(56) References Cited

U.S. PATENT DOCUMENTS

| | | | |
|---|---|---|---|
| 2011/0008638 | A1 | 1/2011 | Miyawaki et al. |
| 2016/0010275 | A1 | 1/2016 | Minko et al. |
| 2016/0126554 | A1 | 5/2016 | Beneventi et al. |
| 2018/0010299 | A1 | 1/2018 | Hu et al. |
| 2019/0111175 | A1 | 4/2019 | Luukko et al. |

FOREIGN PATENT DOCUMENTS

| | | |
|---|---|---|
| CN | 108059953 A | 5/2018 |
| EP | 2267222 A1 | 12/2010 |
| EP | 3228329 A1 | 10/2017 |
| JP | 2014076653 A * | 5/2014 |
| WO | 2010146088 A1 | 12/2010 |
| WO | 2013060934 A2 | 5/2013 |
| WO | 2018092362 A1 | 5/2018 |
| WO | 2019050819 A1 | 3/2019 |

OTHER PUBLICATIONS

Arauco: Materials Safety Data Sheet Bleached Softwood Kraft Pulp [revised 2016]. Retrieved from the Internet <URL: https://na.arauco.com/en/resources/download/MSDS_BKP_allmills > (Year: 2016).*
Machine translation of JP 2014/076653 A originally published May 2014 to Hamada et al. (Year: 2014).*
Screen Printing: Get Production Rolling With Rotary Screen Printing [online], [2002]. Retrieved from the Internet <URL: https://screenprintingmag.com/get-production-rolling-with-rotary-screen-printing/ > (Year: 2002).*
Chinga-Carrasco et al., On the structure and oxygen transmission rate of biodegradable cellulose nanobarriers, 2012, Nanoscale Research Letters, 7:192, 6 pages (Year: 2012).*
International Search Report from corresponding PCT application No. PCT/IB2019/060208 mailed on Jan. 29, 2020.
Reaz A. Chowdhury et al., Continuous roll-to-roll fabrication of transparent cellulose nanocrystal (CNC) coatings with controlled anisotropy, Cellulose (2018) 25:1769-1781.
Rajesh Koppolu et al, Continuous roll-to-roll coating of cellulose nanocrystals onto paperboard, Cellulose (2018) 25:6055-6069.
Reaz A. Chowdhury et al., Roll-to-roll fabrication of cellulose nanocrystal-poly(vinyl alcohol) composite coatings with controlled anistropy, Cellulose (2018) 25:6547-6560.
Vinay Kumar et al., Roll-to-Roll Processes Cellulose Nanofiber Coatings, Ind. Eng. Chem. Res. 2016, 55, 3603-3613.
Extended European Search Report from corresponding European application No. 19889847.0 dated Jul. 18, 2022.

* cited by examiner

Primary Examiner — Colin W. Slifka
(74) Attorney, Agent, or Firm — Greer, Burns & Crain, Ltd.

(57) ABSTRACT

The present invention is directed to a process for manufacturing a film or coating comprising high amounts of cellulosic nanomaterial. According to the present invention, a screen printing press, such as a rotary screen press, is used to create a film or coating comprising cellulosic nanomaterial. One benefit of the present process is that the suspension used in the printing process has a high dry content and high viscosity, thereby facilitating the process for manufacturing a film or coating comprising high amounts of cellulosic nanomaterial.

9 Claims, No Drawings

PROCESS FOR PRODUCTION OF FILM OR COATING COMPRISING CELLULOSIC NANOMATERIAL

This application is a U.S. National Phase under 35 U.S.C. § 371 of International Application No. PCT/IB2019/060208, filed Nov. 27, 2019, which claims priority under 35 U.S.C. §§ 119 and 365 to Swedish Application No. 1851474-5, filed Nov. 28, 2018.

TECHNICAL FIELD

The present invention is directed to a process for manufacturing a film or coating comprising high amounts of cellulosic nanomaterial. According to the present invention, a screen printing press, such as a rotary screen press, is used to create a film or coating comprising cellulosic nanomaterial. One benefit of the present process is that the suspension used in the printing process has a high dry content and high viscosity, thereby facilitating the process for manufacturing a film or coating comprising high amounts of cellulosic nanomaterial.

BACKGROUND

Films comprising high amounts of cellulosic nanomaterial are known in the art. Depending on how they are produced, the films may have particularly advantageous strength and/or barrier properties, whilst being biodegradable and renewable. Films comprising cellulosic nanomaterial are for example used in the manufacture of packaging materials and may be laminated or otherwise provided on the surface of paper or paperboard materials.

US2016010275 is directed to a method for dyeing a material using a dyed nanocellulose dispersion. The nanocellulose may applied to a textile material by rotary screen printing.

US20160126554 is directed to a printing or spray deposition method for preparing a supported flexible electrode and to a method for manufacturing a lithium ion battery.

One problem with cellulosic nanomaterial, such as MFC, is its high viscosity even at a low solid content. Most of the existing film or web manufacturing techniques require very low viscosity solutions which often means dilute suspensions of cellulosic nanomaterial, such as MFC.

Currently, MFC films have been made with cast forming or cast coating or wet laid techniques. These are all promising techniques but start with very dilute MFC suspensions. Spray or curtain coating are also promising techniques, but requires mostly even more dilute suspension in order to avoid problems with for example nozzle clogging. Another problem with the use of highly dilute suspensions is that the dewatering or drying of the MFC film produced is complicated and requires a considerable energy input. There is thus a need to find methods that can utilize high solid suspensions.

SUMMARY

It has surprisingly been found that drawbacks of the prior art methods can be avoided by using a process according to the present invention.

It is thus an object of the present disclosure to provide an improved method of manufacturing a film or coating comprising a high amount of cellulosic nanomaterial.

It has unexpectedly been found that by using a screen printing press it is possible to produce films and coatings from a suspension having a high solid content and a high viscosity. A further benefit is that the method according to the present invention facilitates "post-healing" or "post-leveling" during the manufacture of the film or coating produced, i.e. the film or coating achieved is more homogenous and has a more even surface than with other technologies for producing films or coatings.

The present invention is directed to a process for the production of a film or coating comprising the steps of:
a) providing a suspension having a dry content of at least 2 wt-% and a Brookfield viscosity of from 150 mPas to 200000 mPas, said suspension comprising cellulosic nanomaterial, wherein the content of the cellulosic nanomaterial of said suspension is at least 50 weight-% based on the dry weight of the solids of the suspension;
b) using the suspension of step a) to print a coating or film using a screen printing press;
c) optionally dewatering and/or drying the coating or film prepared in step b).

The present invention is also directed to a film or coating produced according to the process of the present invention.

A further embodiment of the present invention is a product comprising the film or coating produced according to the process of the present invention.

DETAILED DESCRIPTION

The present invention is directed to the production of a film or coating comprising the steps of:
a) providing a suspension having a dry content of at least 2 wt-% and a Brookfield viscosity of from 150 mPas to 200000 mPas, said suspension comprising cellulosic nanomaterial, wherein the content of the cellulosic nanomaterial of said suspension is at least 50 weight-% based on the dry weight of the solids of the suspension;
b) using the suspension of step a) to print a coating or film using a screen printing press;
c) optionally dewatering and/or drying the coating or film prepared in step b).

The optional dewatering in step c) can be carried out using convection (cylinder, metal belt) or irradiation drying (such as infrared drying) or hot air. It may be beneficial to use contactless drying in order to avoid destruction of the texture of the film or coating. Hence, the coating or film should preferably be dried using non-impact drying methods such as infra-red (IR), ultraviolet (UV), electron beam (EB), hot air or hot steam. A soft nip dryer or contact dryer can also be used. Before drying, the web can be dewatered for example using convention dewatering or a modified press section or by using extended nip dewatering. If making a free standing film, a carrier substrate is used, which is subsequently removed, so that a free standing film is achieved. The carrier substrate is typically a metal belt, a plastic belt or film. When using the method according to the present invention to prepare a coating, the coating is not removed, but dewatered and dried on the substrate. At the time of applying the suspension to the substrate, the substrate may be wet or dry. In one embodiment of the present invention, wet pressing is carried out as part of step c), preferably followed by drying.

The screen printing press used in step b) is preferably a flat-bed press, a cylinder press or a rotary press. Preferably, the screen printing press used in step b) is a rotary screen press. The screen printing press may be provided as one or several units or printing nips, thus enabling preparation of multiple layers of coatings as well as providing coatings on both a front and a back side of a substrate. The screen printing can be carried out either on-line or offline, such as a converting or printing line. In the case of multiple units, interim drying of the product being manufactured can be carried out. The step of printing using the screen printing press may optionally be carried out more than once, i.e. step b) may be repeated, alternatively both step b) and step c) may be repeated. The screen may be selected by the person skilled in the art. Depending on the type of screen used, the thickness of the wet coating or film can be controlled, such that films or coatings having a thickness of from 10 µm to 1000 µm can be achieved, preferably a thickness of from 10 µm to 500 µm, more preferably a thickness of from 10 µm to 500 µm. Preferably, the screen has a permeability such that when placing a 0.05 wt-% cellulosic nanomaterial suspension on the screen at atmospheric pressure (i.e. without applying any pressure) at least 10 wt-% of the cellulosic nanomaterial passes through the screen. In the screen printing press, a squeezing blade or squeegee may be used to press liquid through the screen. One advantage of the present invention is that it facilitates "post-healing" or "post-leveling" during the manufacture of the film or coating produced, i.e. the film or coating achieved is more homogenous and has a more even surface than with other technologies for producing films or coatings. This effect can be enhanced by also shaking the screen or by blowing air onto the surface of the suspension that has been applied to the screen or by using acoustic methods to level out the coating and facilitate the transfer through the screen. Further, a blade or a rod can be used to level the applied coating.

The cellulosic nanomaterial content of the suspension in step a) is in the range of from 50 to 99.9 weight-% based on the weight of solids of the suspension. In one embodiment, the cellulosic nanomaterial content of the suspension may be in the range of 70 to 99 weight-%, in the range of 70 to 95 weight-%, or in the range of from 75 to 90 weight-%. It is preferred that the suspension used in step a) comprises less than 1 wt-% fibers, based on the dry weight of the fibers compared to the total dry weight of the suspension used in step a). Preferably, the cellulosic nanomaterial in the suspension used in step a) has low aspect ratio fibrils, preferably aspect ratio below 100, more preferably aspect ratio below 50. The turbidity of the suspension is preferably less than 200 NTU at 0.1% concentration, more preferably less than 100 NTU at 0.1% concentration, most preferably less than 50 NTU at 0.1% concentration. To measure turbidity, the cellulosic nanomaterial is diluted with a liquid, preferably an aqueous medium, such as water, preferably ion exchanged water at 23° C. and pH 5-8, to a concentration below the gel point of said cellulosic nanomaterial, and turbidity of the diluted sample is measured. Said concentration is 0.1% by weight. The mean value and standard deviation are calculated from the obtained results, and the final result is given as NTU units. Preferably, the cellulosic nanomaterial is microfibrillated cellulose (MFC).

The suspension is step a) may also comprise additives. Such additives may be present in an amount of 0.1-70 wt-%, preferably 0.5-30 wt % or more preferably 1-20 wt % based on the dry weight of the cellulosic nanomaterial. The additives are for example fluidization agents, microparticles, nanoparticles, pigments, colorants, cross-linking agents, sizing agents or thermoplastic particles. Examples of fluidization agents include sorbitol, sodium polyacrylic acid, low molecular starches or proteins, polyvinyl alcohol, polyacrylamide, glycerol, polyethylene oxide, low molecular weight polyethylene glycol, low molecular weight carboxymethylcellulose, dextrins, sugars, hemicellulose and surfactants. Fluidization agents typically facilitate handling, particularly pumping, of high consistency suspensions of cellulosic nanomaterial. The solvent used in step a) is water, a non-aqueous solvent or a solvent mixture. Preferably, the solvent used in step a) is water.

The suspension in step a) has a Brookfield viscosity of from 150 mPas to 200000 mPas, preferably at least 500 mPas, more preferably at least 1000 mPas, more preferably at least 1500 mPas, such as preferably from 2000 mPas to 150000 mPas, more preferably from 4000 mPas to 100000 mPas. The Brookfield viscosity of the suspension can be determined using methods known in the art. Preferably, the Brookfield viscosity is determined at between 20° C. and 25° C., preferably at about 23° C., using a Brookfield viscosimeter (or another suitable apparatus) at a rotational speed of 10 rpm and using a RV Series Viscometer and spindle number 3 or spindle V-72.

The suspension in step a) has a dry content of at least 2 wt-%, preferably at least 4 wt-%, more preferably at least 5 wt-%, such as at least 6 wt-%, yet more preferably at least 8 wt-%, more preferably at least 10 wt-%.

The coating of film produced according to the present invention may also have a texture, i.e. the surface of the coating or film produced may have a structure arising from the method of manufacturing. For example, the structure may be such that it confers visual properties or aesthetic qualities the coating or film produced.

A protective coating in the form of a binder may be applied on top of the film or coating prepared according to the present invention. Examples of suitable binders include microfibrillated cellulose, SB latex, SA latex, PVAc latex, starch, carboxymethylcellulose, polyvinyl alcohol etc. The amount of binder used in a protective coating is typically 1-40 $g/m^2$, preferably 1-20 $g/m^2$ or 1-10 $g/m^2$. Such a protective coating may be provided using methods known in the art. The protective coating may facilitate heat sealing and also reduce water vapor transmission rate (WVTR). The suspension used according to the present invention may also be applied as an overlay, i.e. a varnish.

According to a further embodiment of the present invention, there is provided a laminate comprising a film prepared according to the present invention and a thermoplastic polymer (fossil based or made from renewable resources) coating, such as any one of a polyethylene, polyvinyl alcohol, EVOH, starch (including modified starches), styrene/butadiene, styrene/acrylate, acryl/vinylacetate, polypropylene, a polyethylene terephthalate, polyethylene furanoate, PVDC, PCL, PHB, and polylactic acid.

Applying the polymer to prepare the laminate can be done e.g. by extrusion coating, film coating or dispersion coating. This laminate structure may provide for even more superior barrier properties and may be biodegradable and/or compostable. In one embodiment, the cellulosic nanomaterial film or coating can be present between two coating layers, such as between two layers of polyethylene, with or without a tie layer. According to one embodiment of the present invention, the polyethylene may be any one of a high density polyethylene and a low density polyethylene or mixtures or modifications thereof that could readily be selected by a skilled person.

In a further embodiment of the present invention there is provided the film, coating or laminate according to present invention, wherein said film, coating or laminate is applied to the surface of any one of a paper product and board, which may be referred to as a substrate. The substrate is preferably a paperboard, cartonboard, paper or a converted grade thereof such as mineral or plastic coated paper or paperboard. The substrate is generally not a woven textile. The film, coating or laminate can also be part of a flexible packaging material, such as a free standing pouch or bag, which may be transparent or translucent. The product may also be for example a closure or lid. The product can be incorporated into any type of package, such as a box, bag, a wrapping film, cup, container, tray, bottle etc. The product may also be a label. Aspects of the present invention include a free standing film, free standing pouch or bag.

One embodiment of the present invention is a film or coating produced according to the process of the present invention. The dry basis weight of the obtained film or coating is preferably <100 g/m$^2$, more preferably <70 g/m$^2$ and most preferably <35 g/m$^2$. The film or coating is a thin sheet, mouldable film (such as for thermoforming, deep drawing, press forming) or web. It comprises a high amount of cellulosic nanomaterial and can be laminated to form a multilayered structure as described above. The film or coating may be transparent or translucent. The minimum dry basis weight of the coating or film is preferably 1 g/m$^2$. The present invention is particularly suitable in the production of multilayer structures. When manufacturing a multilayer structure, several layers are combined into one structure. Examples of layers include layers having a barrier function, such as being a barrier to oxygen transmission and/or to water vapour. One or more layers may also be a heat sealing layer, i.e. a layer that can be at least partly melted to enable heat sealing. One or more layers may also be such that it provides strength and/or flexibility to the structure. One or more layers may also provide colour and/or opacity to the structure. One or more layers may also be suitable for printing text, images or patterns. One benefit of multilayer structures is that they are very difficult to counterfeit. In the context of the present invention, at least one layer of such a multilayer structure is manufactured according to the present invention. Advantageously, more than layer of such a multilayer structure is manufactured according to the present invention. One advantage of the present invention is that multilayer structures can be produced in which each layer has a low grammage.

The OTR (oxygen transmission rate) value (measured at standard conditions) of the film or coating as such is preferably <200 cc/m$^2$*day measured at 50% RH, 23° C., preferably <30, more preferably <15 and most preferably <10 (i.e. before further treatment such as PE lamination) at a grammage of 10-50 gsm. The thickness of the film or coating can be selected dependent on the required properties. Film or coating thickness may for example be 10-100 μm, such as 20-50 or 30-40 μm, having a grammage of for example 10-50 gsm, such as 20-30 gsm. The film or coating typically has good barrier properties (e.g. to gas, fat or grease, aroma etc).

The film or coating prepared according to the present invention is typically continuous and, in the case of a coating, typically covers essentially the entire surface to which it is applied. The film or coating prepared according to the present invention may be provided in the form of a pattern but is typically not provided in the form of a pattern. The coating according prepared according to the present invention can be in the form of a spot coating and/or a coating having a texture. Thus, the coating achieved by the method of the present invention may be provided such that it covers only a part of a surface and may also be applied such that it provides texture to a surface.

The film or coating prepared according to the present invention may also be treated so that a texture is provided on the coating or film, using methods known in the art.

As used herein, the term cellulosic nanomaterial refers to nanosize materials comprising cellulose and encompasses microfibrillated cellulose (MFC) as well as cellulose nanocrystals (nanocrystalline cellulose) and mixtures thereof.

Microfibrillated cellulose (MFC) or so called cellulose microfibrils (CMF) shall in the context of the present invention mean a micro-scale cellulose particle fiber or fibril with at average fibril diameter less than 100 nm. MFC comprises partly or totally fibrillated cellulose or lignocellulose fibers. The cellulose fiber is preferably fibrillated to such an extent that the final specific surface area of the formed MFC is from about 1 to about 300 m$^2$/g, such as from 1 to 200 m$^2$/g or more preferably 50-200 m$^2$/g when determined for a freeze-dried material with the BET method.

Various methods exist to make MFC, such as single or multiple pass refining, pre-treatment followed by refining, or high shear disintegration or liberation of fibrils. One or several pre-treatment steps are usually required in order to make MFC manufacturing both energy-efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl, aldehyde and/or carboxyl groups (cellulose obtained by N-oxyl mediated oxidation, for example "TEMPO"), or quaternary ammonium (cationic cellulose). The cellulose may also be methylated or phosphorylated. After being modified or oxidized in one of the above-described methods, it is easier to disintegrate the fibers into MFC.

The microfibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single—or twin-screw extruder, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or other lignocellulosic fibers used in papermaking processes. The product might also contain various amounts of micron size fiber particles that have not been efficiently fibrillated.

MFC can be produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, a cellulose nanofiber material containing multiple elementary fibrils with both crystalline and amorphous regions, having a high aspect ratio with width of 5-30 nm and aspect ratio usually greater than 50.

According to another embodiment, the suspension used in step a) may comprise a mixture of different types of fibers, such as microfibrillated cellulose, and an amount of other types of fiber, such as kraft fibers, fines, reinforcement fibers, synthetic fibers, dissolving pulp, TMP, CTMP or PGW.

The suspension may also comprise other process or functional additives, such as fillers, pigments, wet strength chemicals, retention chemicals, cross-linkers, softeners or plasticizers, adhesion primers, wetting agents, biocides, optical dyes, fluorescent whitening agents, de-foaming chemicals, hydrophobizing chemicals such as AKD, ASA, waxes, resins etc. The additives may enable the production of active layers, for example when the additives are chemical compounds such as gas scavengers, sulphur-containing compounds etc. Preferably, the additives are not electrically conductive particles.

The film, coating or laminate described herein may also be applied to other paper or board products, such as food containers, paper sheets, paper boards or boards or other structures that need to be protected by a barrier film or coating.

The film or coating obtained according to the present invention is typically such that it is possible to print on the film or coating using printing methods known in the art.

EXAMPLES

Free standing films were made by using a flat-bed screen printing unit (Roku Print, GmbH)) equipped with a PET 1500 Screen having a mesh count of 24/140-W.

Coating and free standing film were prepared by single and multilayer coating on a metal carrier substrate. The coatings were dried in an oven dryer (50-70° C.) before tested or applying the subsequent coating.

Wet nanocellulose or microfibrillated cellulose (MFC) was prepared from kraft pulp and enzyme treated and fibrillated. The MFC suspension was applied on the screen at a printing consistency of 3 wt %.

The Brookfield viscosity (Spindle V-72, 10 rpm) of the MFC was 3680 cP when measured at room temperature and at a consistency of 1.5 wt %.

Experiment 1. Single Coating

A coating was prepared by screen printing one MFC layer on an uncoated paperboard substrate and then drying. The coat weight was estimated to about 8 gsm (gravimetrically determined).

Barrier properties were not determined, whereas it confirms that thin coatings can be made.

Experiment 2. Multilayer Coating

A free standing film was prepared by screen printing 5 MFC layers on a metal substrate with interim drying. The estimated coat thickness was about 25 µm. In this case, the MFC suspension was de-aerated before coating.

The oxygen barrier (oxygen transmission rate) determined for the sample was 62 cc/m$^2$/24 h/atm according to the ASTM F-1927-98 (23° C., 50% RH)

Experiment 3. Multilayer Coating

A free standing film was prepared by screen printing 5 MFC layers on a metal substrate with interim drying. The estimated coat thickness was about 29 µm. In this case, the MFC suspension was not de-aerated.

The oxygen barrier determined for the sample was 3.1 cc/m$^2$/24 h/atm according to the ASTM F-1927-98 (23° C., 50% RH)

In view of the above detailed description of the present invention, other modifications and variations will become apparent to those skilled in the art. However, it should be apparent that such other modifications and variations may be effected without departing from the spirit and scope of the invention.

The invention claimed is:

1. A process for the production of a free standing film comprising the steps of:
   a) providing a suspension having a dry content of at least 2 wt-% and a Brookfield viscosity of from 150 mPas to 200,000 mPas, said suspension comprising cellulosic nanomaterial, wherein a content of the cellulosic nanomaterial of said suspension is at least 50 weight-% based on the dry weight of the solids of the suspension, wherein the carrier substrate is subsequently removed; and,
   b) using the suspension of step a) to print a film on a carrier substrate using a screen printing press.

2. The process according to claim 1, wherein the dry content of the suspension in step a) is at least 5 wt-%.

3. The process according to claim 1, wherein the dry content of the suspension in step a) is at least 10 wt-%.

4. The process according to claim 1, wherein the Brookfield viscosity of the suspension in step a) is between 4,000 mPas to 200,000 mPas.

5. The process according to claim 1, wherein an OTR value of the film prepared is less than 15 cc/m$^2$*day measured at 50% RH, 23° C. at a grammage of 5-50 g/m$^2$.

6. The process according to claim 1, wherein the content of cellulosic nanomaterial of the suspension in step a) is at least 60 weight-% based on the weight of solids of the suspension.

7. The process according to claim 1, wherein a rotary screen press is used in step b).

8. The process according to claim 1, wherein Brookfield viscosity is determined using a Brookfield viscosimeter at a rotational speed of 10 rpm and using a RV Series Viscometer and spindle number 3.

9. The process of claim 1 further comprising the step of: dewatering and/or drying the coating or film prepared in step b).

* * * * *